United States Patent
Shibasaki (10) Patent No.: US 9,064,178 B2
(45) Date of Patent: Jun. 23, 2015

(54) EDGE DETECTION APPARATUS, PROGRAM AND METHOD FOR EDGE DETECTION

(71) Applicant: DWANGO Co., Ltd., Tokyo (JP)

(72) Inventor: Koichi Shibasaki, Tokyo (JP)

(73) Assignee: DWANGO Co., Ltd. (JP)

( * ) Notice: Subject to any disclaimer, the term of this patent is extended or adjusted under 35 U.S.C. 154(b) by 244 days.

(21) Appl. No.: 13/727,789

(22) Filed: Dec. 27, 2012

(65) Prior Publication Data

US 2013/0170756 A1    Jul. 4, 2013

(30) Foreign Application Priority Data

Dec. 28, 2011    (JP) .................. 2011-289775

(51) Int. Cl.
*G06K 9/46* (2006.01)
*G06T 7/00* (2006.01)

(52) U.S. Cl.
CPC ............ *G06K 9/4604* (2013.01); *G06T 7/0085* (2013.01)

(58) Field of Classification Search
CPC .............................. G06K 9/4604; G06T 7/0083
USPC .......................................... 382/199, 264, 266
See application file for complete search history.

(56) References Cited

U.S. PATENT DOCUMENTS

| | | | |
|---|---|---|---|
| 6,081,627 A | | 6/2000 | Kannon et al. |
| 2002/0076106 A1* | | 6/2002 | Kondo et al. .............. 382/194 |
| 2005/0152604 A1* | | 7/2005 | Kitagawa et al. .......... 382/209 |
| 2005/0280852 A1* | | 12/2005 | Namizuka .................. 358/1.9 |
| 2008/0218782 A1* | | 9/2008 | Seki et al. ................. 358/1.9 |
| 2010/0026717 A1* | | 2/2010 | Sato .............................. 345/642 |

FOREIGN PATENT DOCUMENTS

| JP | 2003-009175 A | 1/2003 |
|---|---|---|
| JP | 2004-310750 A | 11/2004 |
| JP | 2006-195622 A | 7/2006 |
| JP | 2011-172261 A | 9/2011 |

OTHER PUBLICATIONS

Chan-Ta-K'z, No. 3 Image Processing using Mask, C Magazine, Softbank Publishing Corporation, Dated Jun. 1, 2014, vol. 1.16, No. 6. (pp. 89-96).

* cited by examiner

*Primary Examiner* — Samir Ahmed
(74) *Attorney, Agent, or Firm* — Harness, Dickey & Pierce, P.L.C.

(57) ABSTRACT

In the conventional technology for edge detection by normalizing brightness value of a target pixel C for edge determination and brightness of peripheral blocks of the target pixel C, an effect on an image due to a camera lens has not been considered. Specifically, the camera lens has a circular shape and the photographed image is basically formed by circularly collected light. In the conventional technology, however, it has been difficult to carry out high-precision edge detection due to rectangular shape of the peripheral blocks. In order to solve the above deficiency, in an aspect of the present invention provides an edge detection apparatus having a function of weighting the pixel values in the 'peripheral area' to be compared with the target pixel C for edge determination, such that the peripheral area has the circular shape.

9 Claims, 10 Drawing Sheets

| Lens ID | Depth of field |
|---------|----------------|
| FCE | 1.973 |
| Do40 | 0.940 |
| APS | 3.259 |
| DiM | 0.415 |
| DM-FZ | 4.963 |
| C50ZA | 0.166 |
| ⋮ | ⋮ |

Fig10

EDGE DETECTION APPARATUS, PROGRAM AND METHOD FOR EDGE DETECTION

BACKGROUND OF THE INVENTION

1. Field of the Invention

The present invention relates to a technology for appropriately detecting edge of an image.

2. Description of the Related Art

Images taken by a camera and raster illustrations etc. include various objects, so that it is quite difficult to carry out identification of the objects in a computer, or it is required for the computer to execute high-load operations. Meanwhile, it is required to perform identification of objects in the image information in various situations such as detection of a suspicious figure by separating the figure from background by real-time analysis in a security camera, or processing for enhancing edge (outline) of the respective objects in an image of blurring. Therefore, various edge detection technologies for identifying objects in the image are provided. Specifically, the edge is a portion where precipitous change in brightness in the image is found, and Canny edge detection utilizing brightness gradient etc, and differentiation based edge detection are well known.

Moreover, since the respective pixel values in the image taken by the camera are determined by integrating color of object and color of light, it is preferable to carry out the edge detection only by the color of object excluding effects of the lights such as unevenly lighting. An example of estimating only the light from the integration value of the color of object and the color of light indicated by the image data includes image blurring. In Japanese Patent No. 3909604, when a coefficient, calculated by normalizing a brightness value of a target pixel C for edge determination and a brightness value in peripheral image of blurring (an average brightness value in a block configured by peripheral pixels of the pixel C), is more than or equal to 1, it is determined that the pixel C is an edge.

RELATED ART DOCUMENTS

Patent Document: Japanese Patent No. 3909604

However, in the conventional technology for edge detection in Japanese Patent No. 3909604 by normalizing brightness value of a target pixel C for edge determination and brightness of peripheral blocks of the target pixel C, an effect on an image due to a camera lens has not been considered. Specifically, the camera lens has a circular shape and the photographed image is basically formed by circularly collected light. In the conventional technology, however, it has been difficult to carry out high-precision edge detection due to rectangular shape of the peripheral blocks.

SUMMARY OF THE INVENTION

In order to solve the above deficiency, in an aspect of the present invention provides an edge detection apparatus having a function of weighting the pixel values (i.e. brightness value or similar value) in the 'peripheral area' to be compared with the target pixel C for edge determination, such that the peripheral area has the circular shape.

Specifically, an aspect of the present invention provides an edge detection apparatus, comprising an acquisition unit for pixel value of target pixel, acquiring a pixel value of a target pixel for edge determination; a calculation unit for blurring average pixel value, calculating a blurring average pixel value that is an average value of pixel values in an area peripheral to the target pixel for edge determination; and a determination unit, determining whether the target pixel value divided by the blurring average pixel value is more than or equal to a predetermined threshold value, wherein the calculation unit for blurring average pixel value further comprises a weighting section, upon calculating the average value, weighting the pixel values of the peripheral pixels, such that the average value is equal to an average value in a circular area having the target pixel for edge determination as an approximately central point.

Moreover, in another aspect of the present invention provides the edge detection apparatus having the above configuration, further comprising a generation unit for image with enhanced edge, generating an image with enhanced edge according to the determination result by the determination unit; and a variation unit for threshold value, varying the threshold value.

Moreover, the respective camera lenses have range of blurring (i.e. depth of field), and narrow range of blurring allows to maintain detection accuracy with small-size image having peripheral blurring. In another aspect of the present invention provides the edge detection apparatus having the above configuration, wherein the calculation unit for blurring average pixel value further comprises a variation section, varying a size of the peripheral area to be selected for calculating the average pixel value by the calculation unit for blurring average pixel value. Moreover, the edge detection apparatus, further comprising an acquisition unit for depth of field, acquiring a depth of field upon generating an image for edge determination; and a control unit for variation, controlling the size of the peripheral area varied by the variation section according to the acquired depth of field.

Moreover, in the above edge detection apparatus, the pixel value used for edge detection is preferably luminosity expressed by CIE-LAB color space. Furthermore, a program for causing a computer to execute a process for the edge detection, and a computer-readable storage medium storing the program are provided.

According to the present invention having the above configuration, it is possible to compare the average pixel value in the image with peripheral blurring with the pixel value of the target pixel C for edge determination on the basis of the shape of the image with peripheral blurring according to the shape of the camera lens, thereby carrying out high-precision edge detection.

DESCRIPTION OF THE PREFERRED EMBODIMENTS

Hereinafter, embodiments of the present invention will be described with reference to diagrams. The present invention is not to be limited to the above embodiments and able to be embodied in various forms without departing from the scope thereof.

The first embodiment will mainly describe claims 1, 2, 5, 6 and 7. The second embodiment will mainly describe claims 3 and 4.

First Embodiment

<Outline of First Embodiment>

Figure 1:
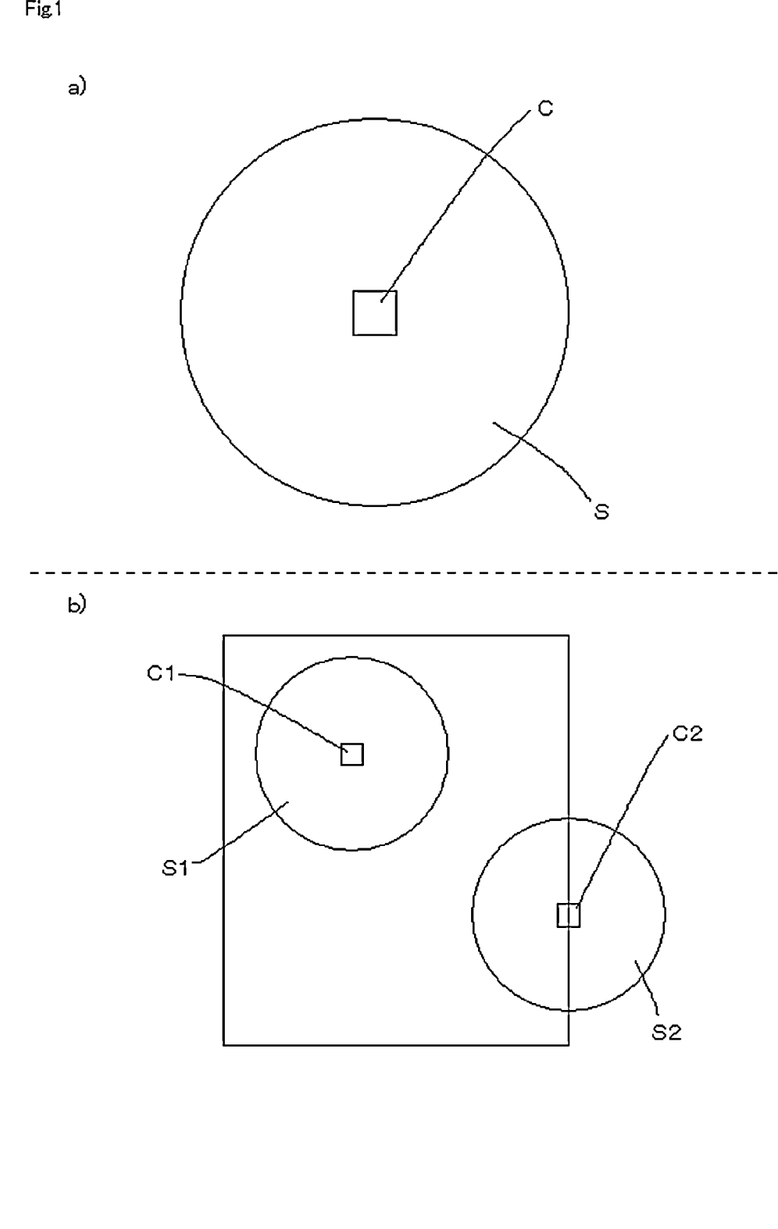
FIG. 1 is a conceptual diagram exemplifying edge detection by an edge detection apparatus of a first embodiment.

FIG. 1 is a conceptual diagram exemplifying edge detection by an edge detection apparatus of a first embodiment. As shown in FIG. 1 (a), in the edge detection apparatus of the first embodiment, a circular area S is selected for a central pixel C as a target for edge detection. Note that since the respective pixels in a digital image have rectangular shape, the area configured by the rectangular pixels cannot be selected as the circular area. Therefore, weighting is carried out for pixel values of pixels forming circular arc in the circular area S, so that it is possible to carry out similar processing to the processing based on the pixel value in the circular area.

Then, as shown in FIG. 1 (b), when the center and the peripheral area include the same object, lighting condition, and texture, the ratio between the pixel value (e.g., brightness value) c1 of the central pixel C1 and the average brightness value s1 of the peripheral area S1 approaches to 1. Meanwhile, when the center and the peripheral area include the different object, lighting condition, and texture, the ratio between the pixel value c2 of the central pixel C2 and the average brightness value s2 of the peripheral area S2 departs from 1. Therefore, it is possible to determine by a formula: $\alpha'=|c/s-1|$ ($\alpha'$ is an index for determination). Moreover, the value s is indicated by an average pixel value for unsharpness processing for the image, so that, as described above, it is possible to exclude the effect of the light from the image, and to make the peripheral area have the circular shape same as the light collecting lens in the image acquisition, thereby comparing the pixel values on the basis of more accurate light collecting area, and carrying out the high-precision edge detection.

<Functional Configuration of First Embodiment>

Figure 2:
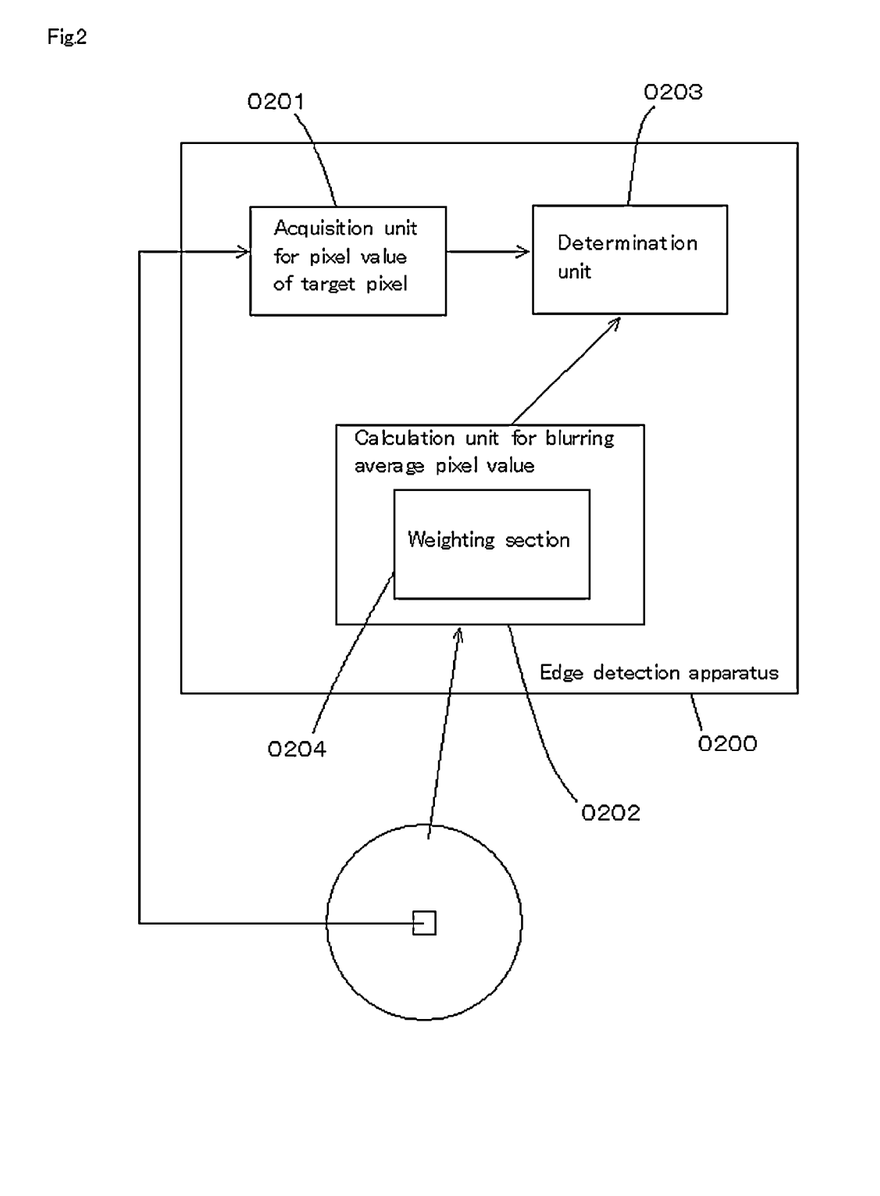
FIG. 2 is a functional block diagram of the edge detection apparatus of the first embodiment.

FIG. 2 is a functional block diagram of the edge detection apparatus of the first embodiment. Note that, the following functional block of the edge detection apparatus can be implemented by a combination of hardware and software. Specifically, in the case of utilizing a computer, examples of the hardware and software include hardware components configured by a CPU, a main memory, a bus, a secondary storage device (e.g., a hard disk or a nonvolatile memory, a storage media such as CD or DVD, or a reading drive for the above media), an input device for inputting information, a printing device, a display device, other peripheral devices; and interfaces for the other peripheral devices and a communication interface; and driver program for controlling the above hardware, other application programs, and an application for user interface. The CPU executes an operation in accordance with the program developed on the main memory, so that processing and storing of the data, inputted through the input device or the interface etc. and stored in the memory of the hard disk, are executed, and instructions to control the hardware and software are generated. Moreover, the functional block of the apparatus may be implemented by a specialized hardware.

Moreover, the present invention can be implemented not only as a apparatus but also as a method thereof. Moreover, a portion of such inventions may be configured as software. Furthermore, a software product used for causing a computer to execute such software, and the recording medium, in which the software is installed, should be included in the technical scope of the present invention (the same applies throughout the entire specification).

As shown in FIG. 2, the 'edge detection apparatus' 0200 of the first embodiment comprises an 'acquisition unit for pixel value of target pixel' 0201, a 'calculation unit for blurring average pixel value' 0202, and a 'determination unit' 0203. Moreover, the calculation unit for blurring average pixel value further comprises a 'weighting section' 0204.

The 'acquisition unit for pixel value of target pixel' 0201 has a function of acquiring a pixel value of a target pixel for edge determination, and can be implemented by a CPU, a main memory, and an acquisition program for pixel value of target pixel. The 'pixel value of a target pixel' is a pixel value of a target pixel for edge detection such as a brightness value, RGB value, HSV (color phase, saturation or luminosity) value, and since the edge is basically detected by variation of brightness, it is preferable that the pixel value of a target pixel can be converted to the brightness value when the pixel value is other than the brightness value. Moreover, the target pixel may be one pixel or a group of small number of pixels (e.g., two by two).

In the acquisition unit for pixel value of target pixel, for example, when being installed in a camera device and carrying out real-time edge detection of a shot image, a combination of one or more photoelectric conversion elements such as CCD image sensor or CMOS sensor corresponds to one pixel, so that charge amount detected by the photoelectric conversion elements corresponding to the target pixel is acquired as the brightness value. Moreover, when being installed in a PC (Personal Computer) and acquiring pixel value from the target pixel of an image configured as a digital image data, for example, the pixel value such as the RGB value of the target pixel is acquired from the digital image data. In this case, it is possible to convert the RGB value acquired by a predetermined formula such as '$Y=0.2126 \times R+0.7152 \times G+0.0722 \times B$' (Y: brightness value) to the brightness value.

The acquired pixel value is preferably the luminosity expressed by CIE-LAB color space. When carrying out the edge detection using the pixel value as the luminosity expressed by CIE-LAB color space, it is possible to accurately carry out the edge detection using a shape that is more close to human sense. This allows to avoid a detection error such as detecting letters written on the backside of a thin paper that human eyes do not detect.

The 'calculation unit for blurring average pixel value' 0202 has a function of calculating a blurring average pixel value that is an average value of pixel values in an area peripheral to the target pixel for edge determination, and can be implemented by a CPU, a main memory, and a calculation program for blurring average pixel value. The 'blurring average pixel value' is an average value of pixel values in the peripheral area of the target pixel for edge determination. Moreover, the peripheral area is determined by the calculation program for blurring average pixel value, and an example of the area includes an area within 10 pixels radius having the target pixel as the center. Moreover, the value indicating the size of the area such as 10 pixels in radius may be preliminarily determined, or may be variable such as 1% of vertical/horizontal pixels in an image. Moreover, as described in the second embodiment, the value may be variable according to lens property (depth of field) used for acquiring an image as the target for edge detection. Subsequently, the pixel value of the pixel included in the peripheral area as determined is acquired, thereby calculating an average value. Note that in the calculation of the average value, the pixel value of the target pixel may be included or may be excluded.

Subsequently, the calculation unit for blurring average pixel value of the edge detection apparatus of the first embodiment, as described above, processes, such that the peripheral area has a circular shape according to the lens shape, and calculates the average value of the pixel values in the circular area, thereby improving the accuracy of the edge detection. For this purpose, the calculation unit for blurring average pixel value further comprises the weighting section.

The 'weighting section, upon calculating the average value' 0204 has a function of weighting the pixel values of the peripheral pixels, such that the average value is equal to an average value in a circular area having the target pixel for edge determination as an approximately central point.

Figure 3:
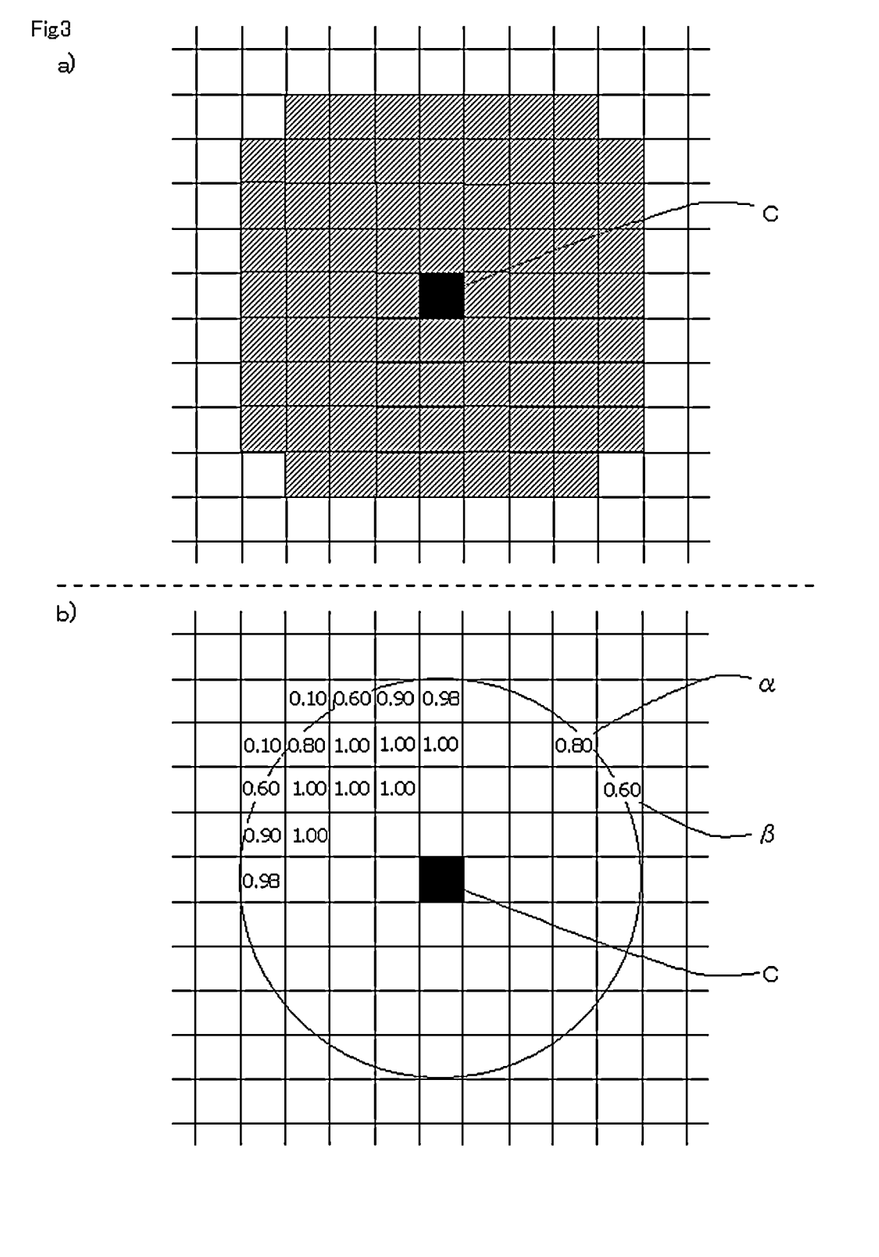
FIG. 3 is a conceptual diagram exemplifying weighting by a weighting section of the edge detection apparatus of the first embodiment.

FIG. 3 is a conceptual diagram exemplifying weighting by a weighting section of the edge detection apparatus of the first embodiment. As shown in FIG. 3(*a*), for example, the area having the target pixel c as the center, where the area is preliminarily determined by a program, or is calculated, is selected as the approximately circular area, and pixel values of the pixels (shaded portion) included in the area is acquired. Subsequently, integration of weighting value, which is preliminarily determined by a program according to a position of the pixel (relative position from the target pixel), and the acquired pixel value of the pixel is acquired. As shown in FIG. 3(*b*), when the pixel is perfectly included in the circular area, this weighting value is '1', and when the pixel forms arc of the circular area, the weighting value is determined according to the size of the portion forming the arc. For example, the weighting value for the pixel α is '0.80', and the weighting value for the pixel β is '0.60'. Therefore, the weighting the pixel value of the respective pixels configuring the approximately circular area is carried out by utilizing the value set with respect to each pixel, it is possible to acquire the pixel value of the peripheral pixels as is the case in the circular area, thereby calculating the average value.

Therefore, the average pixel value in the peripheral area similar to the circular area having the same shape of the lens used for the light collection for acquiring the image is used as the pixel value in the blurring area to be compared with the target pixel, thereby carrying out the high-precision edge detection.

The 'determination unit' 0204 has a function of determining whether the target pixel value divided by the blurring average pixel value is more than or equal to a predetermined threshold value, and can be implemented by a CPU, a main memory, and a determination program. Subsequently, by using the pixel value of the target pixel c and the average pixel value s in the peripheral area similar to the circular area, 'α=c/s−1' is acquired, and when this value is more than or equal to 0.2, or less than or equal to −0.2, it is determined that the target pixel is edge.

Moreover, the edge detection apparatus of the first embodiment may carry out various processes for the pixel with edge detected as the above. For example, the edge detection apparatus' of the first embodiment may comprise a 'generation unit for image with enhanced edge' and a 'variation unit for threshold value'. The 'generation unit for image with enhanced edge' has a function of generating an image with enhanced edge according to the determination result by the determination unit. The 'variation unit for threshold value' has a function of varying the threshold value used by the determination unit. Moreover, the variation of the threshold value may be executed by input by a user, or a value automatically calculated according to a predetermined variable such as a number of vertical/horizontal pixels in the input image or an average brightness of the entire input image.

Figure 4:
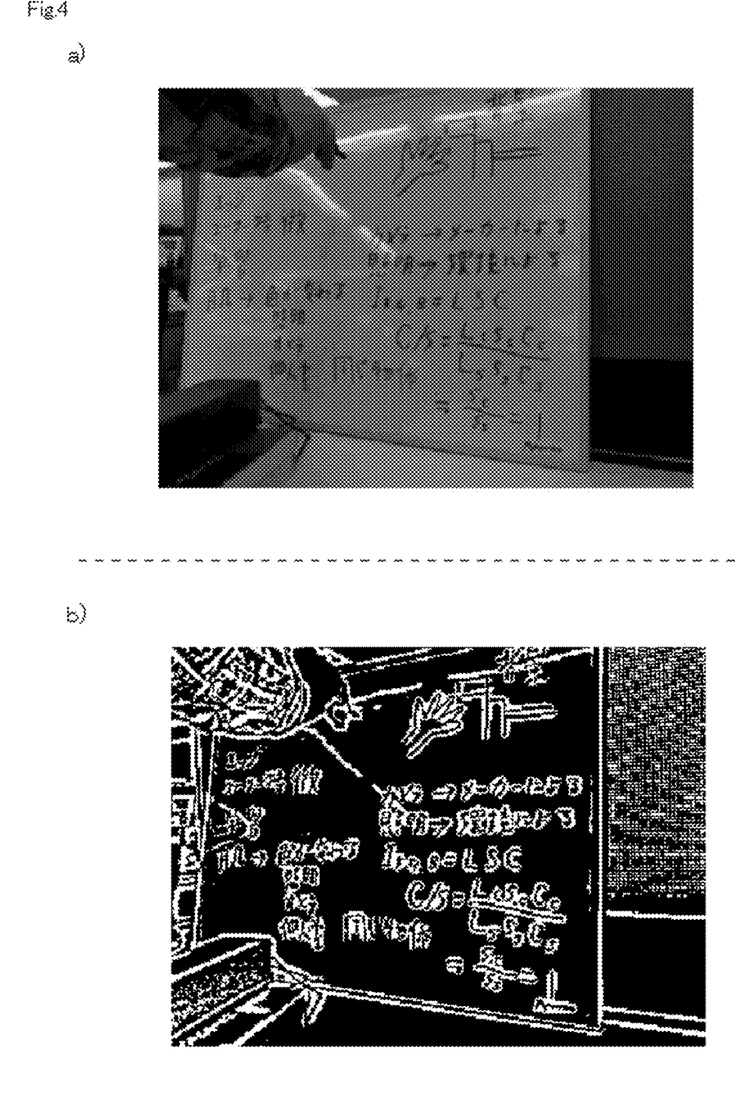
FIG. 4 is a diagram exemplifying an image with enhanced edge generated by the edge detection apparatus of the first embodiment.
Figure 5:
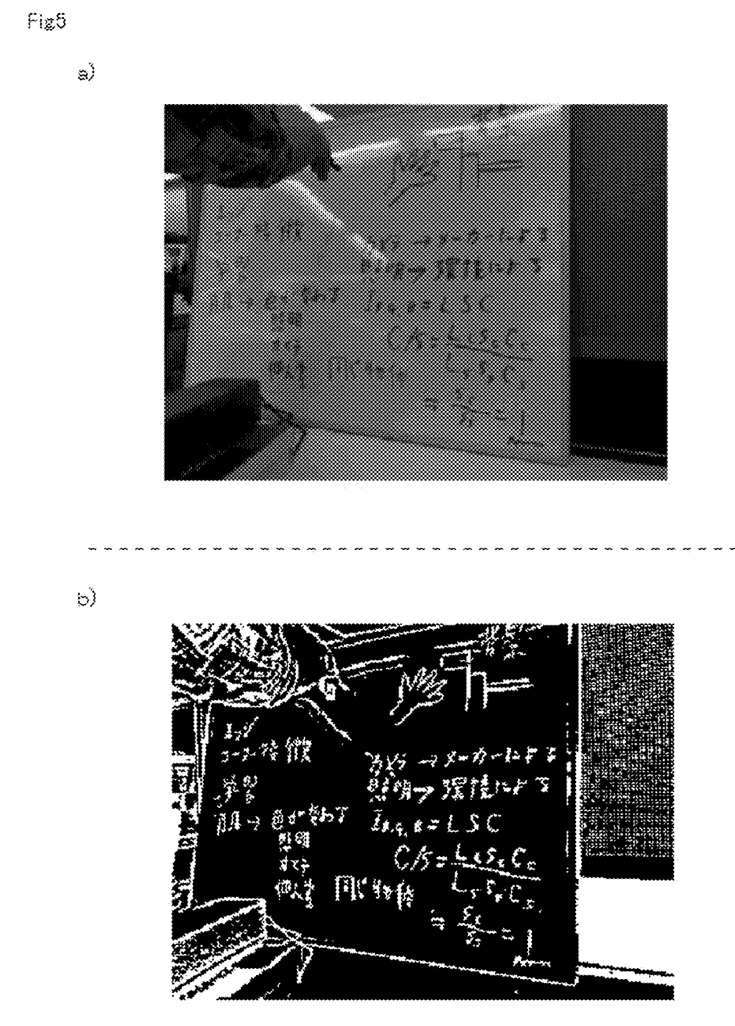
FIG. 5 is a diagram exemplifying another image with enhanced edge generated by the edge detection apparatus of the first embodiment.

FIG. 4(*b*) is a diagram exemplifying an image with enhanced edge, where the target pixel of α>0.2 in the input image of FIG. 4(*a*) is set as the edge pixel, and other pixels are set as flat pixels, thereby executing digitalization. FIG. 5(*b*) is a diagram exemplifying an image with enhanced edge, where the target pixel of α<−0.2 in the input image of FIG. 5(*a*) is set as the edge pixel, and other pixels are set as flat pixels, thereby executing digitalization. As shown in these figures, the edge detection apparatus of the first embodiment can precisely detect the edge from the image.

Moreover, the edge detection may be carried out by using the positive threshold value, using negative threshold value, or using both of them and adding a detection of boundary in the two digitalized images depending on a target (purpose) for edge detection and other conditions. For example, in order to detect a small black character written on white field, it is preferable to use the negative threshold value. Meanwhile, in order to detect a large and wide character, it is preferable to use the positive threshold value.

Here, a concrete description of the positive/negative threshold value is provided. The edge exists on the boundary of pixel, so that pixel on any side adjacent to the edge can be used for the edge expression upon expression of image. Moreover, if there is brightness difference exists between the sides adjacent to the edge, when detecting the darker side as the edge, the positive threshold is used, and when detecting the brighter side as the edge, the negative threshold is used. Moreover, the edge detection is respectively carried out for each side using the positive/negative threshold value, and statistical processing such as averaging, decentralization and standard deviation by using both results is executed, thereby detecting edge.

As shown in figures, the edge detection apparatus of the first embodiment can precisely detect only the edge portion.

Moreover, the edge detection apparatus may carry out not only generation of the image with enhanced edge using the edge determination result of the respective pixels, but also determination of unevenness in the image by counting number of detected edges. Moreover, it is possible to utilize the generated image with enhanced edge, for example, in the case of a monitor camera, a matching is carried out for a pattern image showing a typical human figure and outline of a human face or an image with enhanced edge of a photograph of the suspect, thereby detecting a suspicious person. Moreover, by combination with AR (Augmented Reality) technology, an object as a marker for displaying an AR object image in the camera image may be detected by pattern matching for the image with enhanced edge and the image of the marked object, and the AR object image may be displayed in the camera image, such that the AR object image is superimposed on the detected object.

<Hardware Configuration of First Embodiment>

Figure 6:
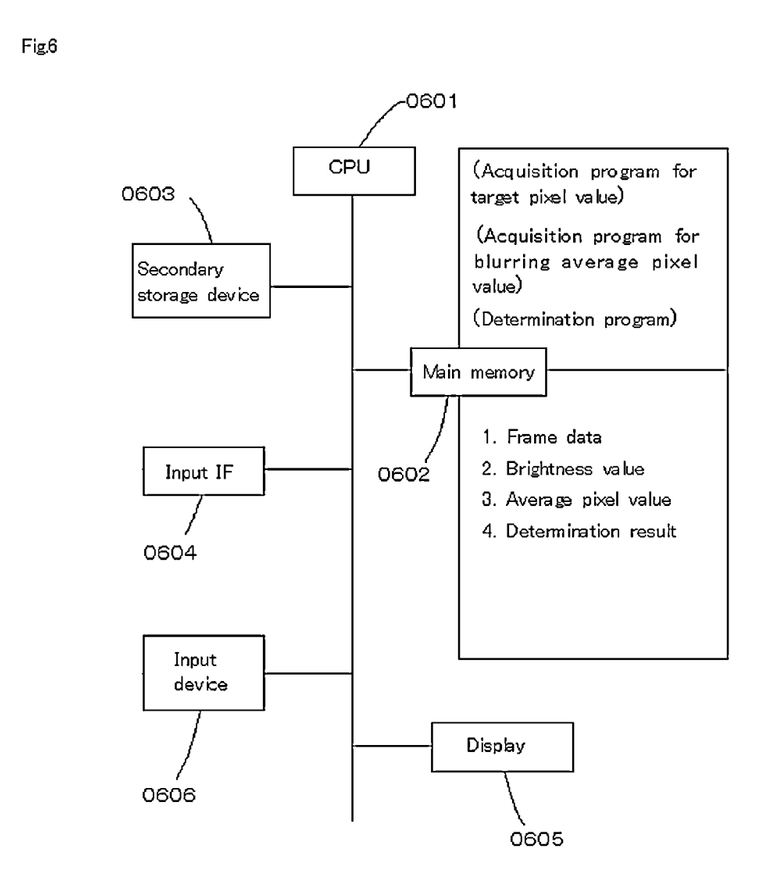
FIG. 6 is a diagram exemplifying a hardware configuration of the edge detection apparatus of the first embodiment.

FIG. 6 is a diagram exemplifying a hardware configuration of the edge detection apparatus. With reference to FIG. 6, operations of the respective hardware components in the edge detection apparatus will be described.

As shown in FIG. 6, the edge detection apparatus is provided with a 'CPU' (0601) and a 'main memory' (0602) working as the calculation unit for blurring average pixel value, the weighting section and the determination unit, a 'secondary storage device' (0603) for storing various data and programs, an 'input IF (Interface)' (0604) connected with a camera or an image reproduction device, and used for inputting the image data for edge detection, a 'display' (0605) for displaying the inputted image and image with enhanced edge, and a 'UI (User Interface)' (0606) for receiving input by a user. These components are mutually connected through the data communication path of 'system bus' etc, thereby carrying out transmission/reception and processing of the information.

Moreover, the programs are developed in the 'main memory', and the 'CPU' refers to the program and executes the various calculations. Moreover, a plurality of addresses are assigned to the 'main memory' and the 'secondary storage device', and in the calculation by the 'CPU', address specification and access to the stored data are carried out, thereby executing the calculation by utilizing the data.

When an image is inputted from a camera device etc. connected with the 'input IF', the image is stored in a buffer, not indicated in figure, and a frame as a target is stored at the address 1 in the 'main memory'. Subsequently, the 'CPU' interprets the acquisition program for pixel value of target pixel, and for example, selects the pixel $C_0$ (coordinate: 0,0) in the upper-left corner as the target pixel for edge detection, and store the brightness value c at the address 2 in the 'main memory'.

Subsequently, the 'CPU' interprets the calculation program for blurring average pixel value, and according to an interpretation result, for example, acquires the respective brightness values of the pixels in the area $S_0$ within 10 pixels radius having the target pixel as the center. Subsequently, according to an interpretation result of the weighting program included in the calculation program for blurring average pixel value, the 'CPU' executes integration of the weighting value preliminarily determined by the program and the pixel value of the acquired pixel according to the position of the pixel (relative position from the target pixel). Note that as described above, the weighting value is configured, such that the peripheral area becomes equivalent to a circular area having the target pixel for edge determination as an approximately central point. Subsequently, the 'CPU' calculates average value of the brightness values of the weighted pixels, acquires an average brightness value upon selecting the peripheral area of the target pixel as the blurring image, and stores the value at the address 3 in the 'main memory'.

Subsequently, the 'CPU' interprets the determination program, and according to an interpretation result, executes the calculation of '$\alpha = c/s - 1$', thereby acquiring an index a. Subsequently, the 'CPU' compares the index a with the threshold value determined by the program or the threshold value, separately calculated according to the camera lens property etc, thereby determining whether the relationship between the values such as $\alpha > 0.2$ fulfils a predetermined condition. If the determination result indicates that the condition is fulfilled, identification information of the pixel $C_0$ as the pixel forming the edge is correlated with an edge flag, and is stored at the address 4 in the 'main memory'. If the determination result indicates that the condition is not fulfilled, identification information of the pixel $C_0$ as the pixel not forming the edge is correlated with an non-edge flag, and is stored at the address 4 in the 'main memory'.

Subsequently, the 'CPU' repeats the above processing for all pixels or a predetermined some pixels as the target pixel for edge determination, thereby determining that the respective edges are the pixel with edge or the pixel with no edge. Moreover, the 'CPU' may generate an image where the pixel with edge is white and the pixel with no edge is black, and display the image on the 'display' Moreover, the 'CPU' may interpret the pattern matching program, not indicated in figures, and may execute matching process for the generated image with enhanced edge and the pattern matching image (preliminarily provided reference image for pattern matching). If the determination result indicates that the image is identical with the pattern matching image, the 'CPU' may interpret an alarm program for suspicious person, and transmit the alarm information of suspicious person found in the camera image to a server etc. of a security company, or may interpret the AR program, and may superimpose a predetermined virtual reality image on the area identical with the pattern image in the camera image, thereby displaying the image on the 'display'.

<Processing Flow of First Embodiment>

Figure 7:
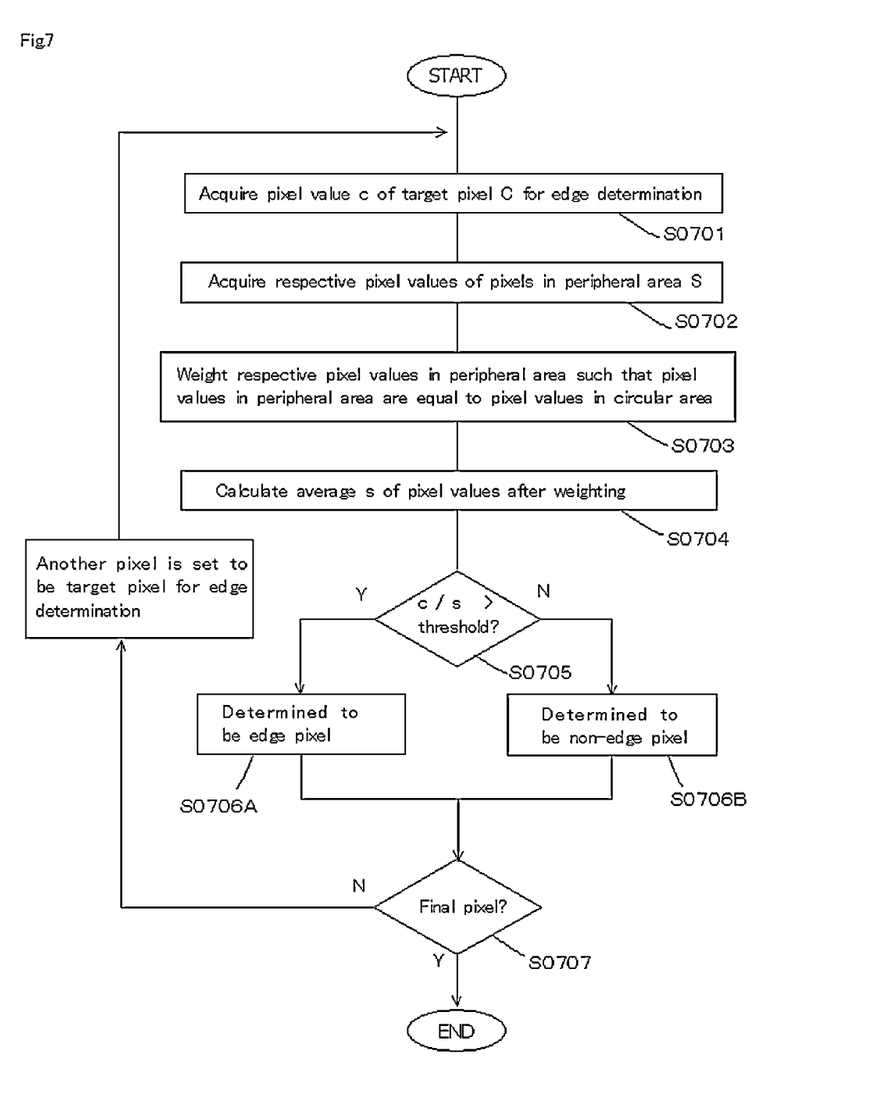
FIG. 7 is a flowchart of the edge detection apparatus of the first embodiment.

FIG. 7 is a flowchart of the edge detection apparatus of the first embodiment. Note that, the following step may be executed by the respective hardware configurations of a computer as above, or may configure a program, which is stored in a medium and is for controlling the computer.

As shown in FIG. 7, at the outset, one pixel (or a group of small number of pixels) is selected as the target pixel C for edge determination, and the pixel value c of the target pixel is acquired (a step S0701). Subsequently, the respective pixel values of the pixels in the peripheral area S, which is a predetermined area around the target pixel for edge determination, is acquired (a step S0702). Subsequently, the respective acquired pixel values in the peripheral area is weighted, such that the peripheral area becomes equivalent to a circular area having the target pixel for edge determination as an approximately central point (a step S0703), thereby calculating the blurring average pixel value s after the weighting (a step S0704). Finally, it is determined whether the value c/s, acquired by dividing the target pixel value acquired in the step S0701 by the blurring average pixel value, is more than or equal to a predetermined threshold value (a step S0705). If the determination result indicates that the value more than or equal to a predetermined threshold value (or less than or equal to the predetermined threshold value), it is determined that the pixel value of the target pixel for edge determination has edge (a step S0706A). If the determination result indicates an opposite result, it is determined that the pixel value of the target pixel for edge determination has no edge (a step S0706B). Subsequently, the 'CPU' repeats the above processing for all pixels or a predetermined some pixels as the target pixel for edge determination up to the final pixel, thereby determining that the respective edges are the pixel with edge or the pixel with no edge (a step S0707).

Note that the above process is an example, and various details or orders of the process may be executed when a similar result is acquired. For example, at the outset, pixel values of all pixels are acquired, and the pixel value C of the target pixel for edge determination is specified. Subsequently, by utilizing a table data, where weighting as shown in FIG. 3(b) is executed to make the peripheral area of e target pixel for edge determination equivalent to a circular area, and the pixel not included from the peripheral area is weighted by the value '0.00', weighting for pixel values of all acquired pixels is executed, thereby calculating the blurring average pixel value (processes after this are the same as the above).

<Effects of First Embodiment>

According to the edge detection apparatus of the first embodiment, it is possible to compare the pixel having edge with the blurring average pixel value in the peripheral area according to the shape of the camera lens, and to carry out the edge determination, thereby improving the accuracy in edge detection.

Second Embodiment

<Outline of Second Embodiment>

A second embodiment is on the basis of the first embodiment, and is an edge detection apparatus capable of varying a size of the peripheral area to be selected for calculating the average pixel value. Specifically, it is possible to vary the size of the peripheral area according to the camera lens property etc.

<Functional Configuration of Second Embodiment>

Figure 8:
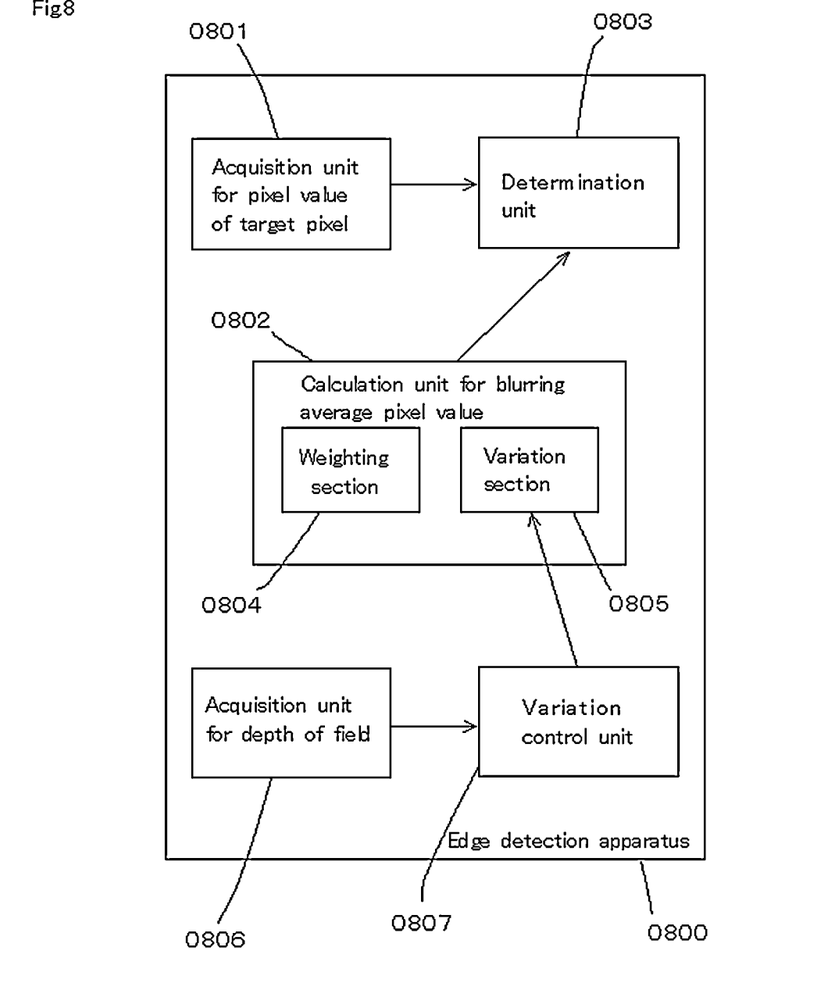
FIG. 8 is a functional block diagram of a edge detection apparatus of a second embodiment.

FIG. 8 is a functional block diagram of an edge detection apparatus of a second embodiment. As shown in FIG. 8, the 'edge detection apparatus' 0800 of the second embodiment is on the basis of the first embodiment, and comprises an 'acquisition unit for pixel value of target pixel' 0801, a 'calculation unit for blurring average pixel value' 0802, and a 'determination unit' 0803. Moreover, the calculation unit for blurring average pixel value further comprises a 'weighting section' 0804. Moreover, the edge detection apparatus of the second embodiment further comprises an 'acquisition unit for depth of field' 0806 and a 'variation control unit' 0807, and the calculation unit for blurring average pixel value further comprises a 'variation section' 0805.

The 'variation section' 0805 has a function of varying a size of the peripheral area to be selected for calculating the average pixel value by the calculation unit for blurring average pixel value, and can be implemented by a CPU, a main memory, and a variation program. Specifically, for example, according to the value inputted by a user, the area within 10 pixels radius having the target pixel as the center is varied to the area within 6 pixels radius.

Moreover, when the blurring range of the image is small due to the focusing property of the lens, therefore, when the depth of field is deep, it is possible to make the size of the peripheral area for calculating the blurring average pixel value small. Meanwhile, when the depth of field is shallow, and the blurring range of the image is large, by making the size of the peripheral area large, it is possible to improve accuracy of the edge detection. Therefore, according to the following configuration, it is possible to set the size of the peripheral area according to the camera lens property etc, generating the target image.

Figure 9:
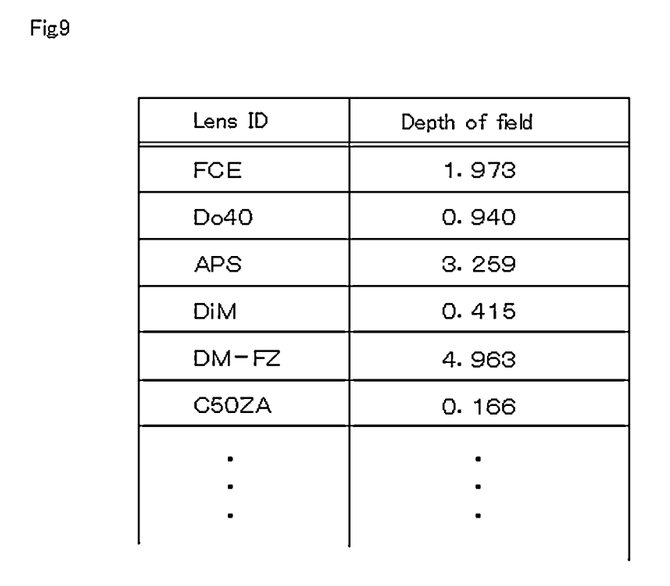
FIG. 9 is a diagram exemplifying acquisition of depth of field by an acquisition unit for depth of field of the edge detection apparatus of the second embodiment.

The 'acquisition unit for depth of field' 0806 has a function of acquiring a depth of field upon generating an image for edge determination, can be implemented by a CPU, a main memory, and an acquisition program for depth of field. FIG. 9 is a diagram exemplifying acquisition of depth of field by an acquisition unit for depth of field of the edge detection apparatus of the second embodiment. When an aperture value is fixed, as described above, since the depth of filed is a lens property, a table data where a lens ID (or a camera ID when a combination of the lens and camera is fixed) and the depth of field of the lens are correlated, is stored in the edge detection apparatus or the external device. Subsequently, when acquiring the image as the target for edge detection, the lens ID or the camera ID is simultaneously acquired, and a search using the ID as a key is executed, thereby acquiring the depth of field. Moreover, upon this, information such as a diameter of the lens as a variable for the depth of field may be acquired.

Moreover, information of focal length and aperture value indicated by so-called 'Exif (Exchangeable image file format)' included in the image data may be acquired, thereby calculating the depth of field using them as variable.

The 'variation control unit' 0807 has a function of controlling the size of the peripheral area varied by the variation section according to the acquired depth of field, and can be implemented by a CPU, a main memory, and a variation control program. Specifically, for example, the size of the peripheral area is controlled to be y, calculated by using the function y=f(x) (y is a size of peripheral area, x is a value indicating depth of field), where the size of the peripheral area is set to be smaller as the value indicating the depth of field of the lens goes larger. Moreover, with reference to a table data etc, indicating correspondence relation between the range of the depth of field and the size of the peripheral area, the size of the peripheral area may be controlled to the size determined by the table data. For example, when the depth of field x (meter) is 0-1.0, the size of the peripheral area y (pixels radius) is 6, or when the depth of field x (meter) is 1.1-2.0, the size of the peripheral area y (pixels radius) is 8.

As described above, the edge detection apparatus of the second embodiment can arbitrarily vary the size of the peripheral area. Moreover, the size of the peripheral area is varied according to the camera lens property etc. used for generating the image as the target for edge detection, so that it is possible to determine the size of the peripheral area to appropriate size for the edge detection. Moreover, it is possible to execute superlative edge detection using an expensive camera for measuring, or to execute practical edge detection using a low-price and low-precision camera.

<Processing Flow of Second Embodiment>

Figure 10:
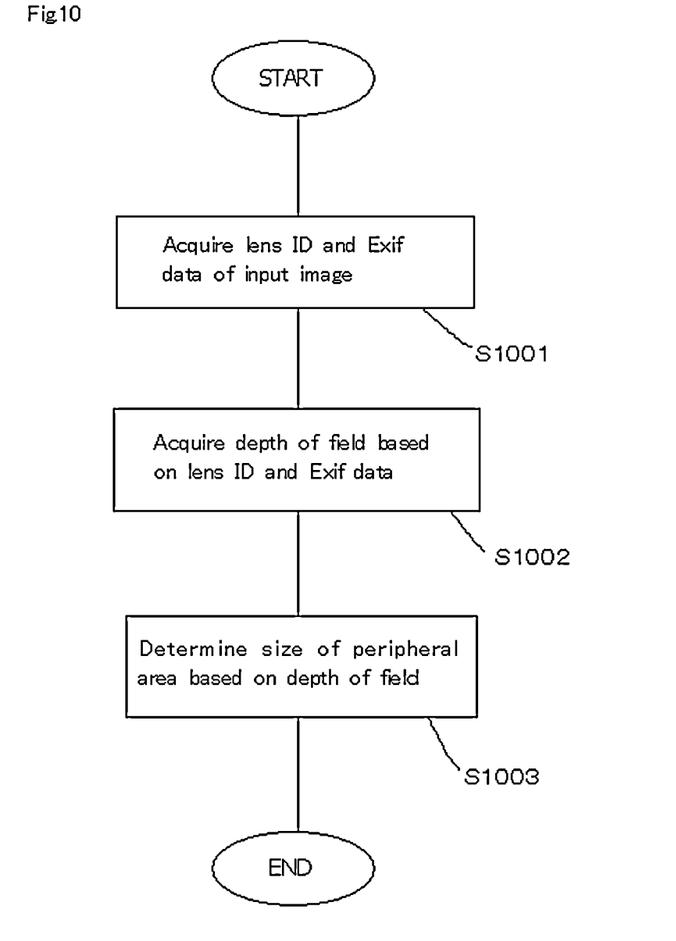
FIG. 10 is a flowchart of the edge detection apparatus of the second embodiment.

FIG. 10 is a flowchart of the edge detection apparatus of the second embodiment. Note that, the following step may be executed by the respective hardware configurations of a computer as above, or may configure a program, which is stored in a medium and is for controlling the computer. Note that the process of the entire edge detection is the same as that in FIG. 7 of the first embodiment, so that description thereof is omitted. Hereinafter, a description of the process of determining the size of the peripheral area used for the step S0702 in FIG. 7 will be provided.

As shown in FIG. 10, at the outset, the lens ID of the lens generating the image and Exif data of the inputted image etc. are acquired with the image as the target for edge detection (a step S1001). Moreover, the information of diameter of the lens may be acquired. Subsequently, with reference to the table data of FIG. 9, which has been preliminarily stored, the search using the acquired ID as a key, thereby acquiring the depth of field upon generating the image (a step S1002). Subsequently, on the basis of the acquired depth of field, the size of the peripheral area is determined by using a predetermined formula or table data (a step S1003).

<Effects of Second Embodiment>

According to the edge detection apparatus of the second embodiment, it is possible to arbitrarily vary the size of the peripheral area. Moreover, the size of the peripheral area is varied according to the camera lens property etc. used for generating the image as the target for edge detection, so that it is possible to determine the size of the peripheral area to appropriate size for the edge detection.

DESCRIPTION OF REFERENCE NUMERALS

0200 Edge detection apparatus
0201 Acquisition unit for pixel value of target pixel
0202 Calculation unit for blurring average pixel value
0203 Determination unit
0204 Weighting section

What is claimed is:

1. An edge detection apparatus that is configured to execute processes by a processor, the edge detection apparatus comprising:

The processor configured to provide:
a target pixel detector configured to detect a target pixel value of a target pixel, the target pixel being a part of a target image taken through a lens, the target image further including a peripheral image located at a peripheral area of the target image;
a peripheral pixel detector configured to detect each of a plurality of blurring pixel values respectively corresponding to a plurality of peripheral pixels, the plurality of peripheral pixels being parts of the peripheral image, the plurality of peripheral pixels being located on and within a virtual circular boundary centered on the target pixel;
a target pixel converter configured to convert the target pixel value into a target pixel brightness value;
a peripheral pixel converter configured to convert the plurality of blurring pixel values of the plurality of peripheral pixels, which are located within the virtual circular boundary, into a plurality of first blurring pixel brightness values, and the peripheral pixel converter configured to convert the plurality of blurring pixel values of the plurality of peripheral pixels, which are located on the virtual circular boundary, into a plurality of second blurring pixel brightness values;
a weight calculator configured to calculate a plurality of weighted second blurring pixel brightness values of the plurality of second blurring pixel brightness values based on a ratio of an area that is within the virtual circular boundary for each of the plurality of second blurring pixel brightness values;
an average calculator configured to calculate an average blurring brightness value by dividing a sum of the plurality of first blurring pixel brightness values and the plurality of weighted second blurring pixel brightness values by the number of the plurality of peripheral pixels; and
a comparator configured to compare the target pixel brightness value and the average blurring brightness value so as to determine whether the target pixel is an edge pixel of the target image.

2. The edge detection apparatus according to claim 1, wherein the comparator determines that the target pixel is the edge pixel when an absolute value of a comparator value a is greater than a threshold value, and the comparator value is calculated by:

$$\alpha = c/s - 1,$$

wherein c is the target pixel brightness value and s is the average blurring brightness value.

3. The edge detection apparatus according to claim 2, wherein the threshold value is 0.2.

4. The edge detection apparatus according to claim 2, further comprising:
an enhanced image generator configured to generate an enhanced target image by enhancing the target pixel brightness value based on the comparator value; and
a threshold value controller configured to change the threshold value.

5. The edge detection apparatus according to claim 1, wherein
the average calculator further includes a virtual circular boundary controller configured to change a diameter of the virtual circular boundary.

6. The edge detection apparatus according to claim 5, further comprising:
a depth of field detector configured to detect a depth of field of the target image, wherein
the virtual circular boundary controller changes the diameter based on the depth of field.

7. The edge detection apparatus according to claim 1, wherein
the target pixel brightness value and the plurality of first and second blurring pixel brightness values are expressed by a LAB color space in a CIE standard colorimetric system.

8. A non-transitory computer-readable medium for causing a computer to execute a process, comprising instructions thereon, that when executed on a processor, perform the steps of:
detecting a target pixel value of a target pixel, the target pixel being a part of a target image taken through a lens, the target image further including a peripheral image located at a peripheral area of the target image;
detecting each of a plurality of blurring pixel values respectively corresponding to a plurality of peripheral pixels, the plurality of peripheral pixels being parts of the peripheral image, the plurality of peripheral pixels being located on and within a virtual circular boundary centered on the target pixel;
converting the target pixel value into a target pixel brightness value;
converting the plurality of blurring pixel values of the plurality of peripheral pixels, which are located within the virtual circular boundary, into a plurality of first blurring pixel brightness values and converting the plurality of blurring pixel values of the plurality of peripheral pixels, which are located on the virtual circular boundary, into a plurality of second blurring pixel brightness values;
calculating a plurality of weighted second blurring pixel brightness values of the plurality of second blurring pixel brightness values based on a ratio of an area that is within the virtual circular boundary for each of the plurality of second blurring pixel brightness values;
for calculating an average blurring brightness value by dividing a sum of the plurality of first blurring pixel brightness values and the plurality of weighted second blurring pixel brightness values by the number of the plurality of peripheral pixels; and
for comparing the target pixel brightness value and the average blurring brightness value so as to determine whether the target pixel is an edge pixel of the target image.

9. A computer-implemented edge detection method for causing a processor to execute a process, the method comprising executing on the processor the steps of:
detecting a target pixel value of a target pixel based on a first instruction from the processor, the target pixel being a part of a target image taken through a lens, the target image further including a peripheral image located at a peripheral area of the target image;
detecting each of a plurality of blurring pixel values respectively corresponding to a plurality of peripheral pixels based on a second instruction from the processor, the plurality of peripheral pixels being parts of the peripheral image, the plurality of peripheral pixels being located on and within a virtual circular boundary centered on the target pixel;

converting the target pixel value into a target pixel brightness value based on a third instruction from the processor;

converting the plurality of blurring pixel values of the plurality of peripheral pixels which are located within the virtual circular boundary into a plurality of first blurring pixel brightness values and converting the plurality of blurring pixel values of the plurality of peripheral pixels which are located on the virtual circular boundary into a plurality of second blurring pixel brightness values based on a fourth instruction from the processor;

calculating a plurality of weighted second blurring pixel brightness values of the plurality of second blurring pixel brightness values based on a ratio of an area that is within the virtual circular boundary for each of the plurality of second blurring pixel brightness values and based on a fifth instruction from the processor;

calculating an average blurring brightness value by dividing a sum of the plurality of first blurring pixel brightness values and the plurality of weighted second blurring pixel brightness values by the number of the plurality of peripheral pixels based on a sixth instruction from the processor;

comparing the target pixel brightness value and the average blurring brightness value so as to determine whether the target pixel is an edge pixel of the target image and storing a comparison result in a memory based on a seventh instruction from the processor; and repeating executing the first through seventh instructions for other target pixels of the target image to determine other edge pixels.

* * * * *